(12) United States Patent
Hammond

(10) Patent No.: US 6,463,808 B1
(45) Date of Patent: Oct. 15, 2002

(54) ULTRASONIC MEASUREMENT SYSTEM WITH CHORDAL PATH

(76) Inventor: Robert H. Hammond, 221 Crescent St., Waltham, MA (US) 02453-3497

(*) Notice: Subject to any disclaimer, the term of this patent is extended or adjusted under 35 U.S.C. 154(b) by 0 days.

(21) Appl. No.: 09/412,236

(22) Filed: Oct. 4, 1999

Related U.S. Application Data

(60) Provisional application No. 60/103,072, filed on Oct. 5, 1998.

(51) Int. Cl.$^7$ ................................................ G01F 1/66
(52) U.S. Cl. ................................................ 73/861.27
(58) Field of Search ..................... 73/861.27, 861.28, 73/861.31, 861.26, 861.25, 861.18, 861.04, 861

(56) References Cited

U.S. PATENT DOCUMENTS

| | | | |
|---|---|---|---|
| 4,102,186 A | 7/1978 | Brown | 73/194 |
| 4,317,178 A | 2/1982 | Head | 364/510 |
| 5,040,415 A | 8/1991 | Barkhoudarian | 73/198 |
| 5,404,745 A | 4/1995 | Chien | 73/29.01 |
| 5,546,812 A | 8/1996 | Drenthen | 73/861.29 |

OTHER PUBLICATIONS

M.V. Zagarola et al., "Scaling of the Mean Velocity Profile for Turbulent Pipe Flow" (*Physical Review Letters*), vol. 78, No. 2, pp. 239–242, (Jan. 1997).

Primary Examiner—Harshad Patel

(57) ABSTRACT

Flow is described by first variables related to a coordinate system, and by at least one second flow-related variable such as friction factor or Reynolds number unrelated to the coordinate system, wherein the first variables are separable or substantially separable from the second variables. The method includes determining average velocities of the fluid on two paths, or taking a first path measurement and at least one point measurement, selected such that combining the first path measurement and the second measurement forms an expression independent of the second variable. In one embodiment, first and second path measurements are combined in accordance with the velocity relationships given by the Pao equation to produce a flow measurement which is independent of the friction factor. A single calibration then allows the meter to be used on diverse conduits with different wall roughness or friction factor. The system also yields a non-invasive measure of the friction factor. A conventional flow meter may be set up by solving for flow profile and analytically determining a meter factor or appropriate measurement path. The measurements may be combined to eliminate the second variable, or to determine a chord on which the measured velocity equals the mean flow velocity across the conduit cross-sectional area. Alternatively, the two transit times may combined to determine a meter factor, or a known flow profile may be used to determine a single chord along which the transit time measurements relate to flow in a manner independent of the second variable.

11 Claims, 2 Drawing Sheets

ULTRASONIC MEASUREMENT SYSTEM WITH CHORDAL PATH

REFERENCE TO RELATED APPLICATION

This application is related to and claims the benefit under 35 U.S.C. §119(e) of U.S. Provisional Patent Application No. 60/103,072 filed Oct. 5, 1998.

BACKGROUND OF THE INVENTION

The present invention relates to ultrasonic flow measurement systems for measuring the flow of fluid in a conduit, and has particular utility in systems such as clamp-on transducer systems, or customized spool pieces having defined transducer locations that determine signal paths through the fluid. In particular, the invention is applicable to situations wherein parameters such as Reynolds number or frictional properties of the conduit interior that affect the actual flow profile, may be unknown, obscuring the relationship between the ultrasonic signal data and the actual flow rate.

In such circumstances, it is customary to perform a number of flow simulations, or to test the actual system in which the flow meter is to be installed, in order to determine a meter factor for converting transit time measurements to flow measurements in use. However this procedure can be effectively carried out only for certain relatively common flow situations and materials. As a practical matter, it is generally not possible to directly experiment on, measure and correlate various flow and transit time readings occurring during actual operation in which fluids of different types at various temperatures, pressures or flow velocities are being passed through conduits during the course of an industrial process, such as a refining or chemical reaction process. Since it is generally not feasible to directly measure either the flow, or system parameters such as the friction factor, ultrasonic measurements are often carried out by a process of informed guesswork to set an appropriate meter factor or other relationship which converts the ultrasonic measurements to a flow velocity, average flow rate or other quantity which is to be measured.

When the system output is to be used as an input to a process controller, it is only necessary to detect some functional flow input parameter, and this suffices since the control laws are modified on an heuristic basis to control the process conditions. However, when it is necessary to accurately measure the actual flow, whether for economic or technical reasons, this approach leaves much to be desired.

It would therefore be desirable to provide an ultrasonic flow measurement system having improved accuracy.

It would also be desirable to provide a flow measurement system capable of determining friction factor.

It would also be desirable to provide an ultrasonic measurement system configured to produce stable and repeatable results in diverse flow situations.

SUMMARY OF THE INVENTION

These and other desirable traits are provided in a method and system for ultrasonic flow measurement which operates by transmitting a signal along one or more paths through a fluid and determining the transit time of the signal along the paths. Flow in the conduit is described by first variables related to a coordinate system, and by second variables not related to a coordinate system, wherein the first variables are separable or substantially separable from the second variables. The method includes the step of transmitting signals along a first path and gong a second path which differs from the first to determine the average velocities of the fluid on the paths, and combining the first path measurement and the second path measurement to form an expression independent of the variables of the second type. In one embodiment, the first and second path measurements are combined in accordance with the velocity relationships given by the Pao equation relating velocity profile to friction, to produce a flow measurement which is independent of the friction factor. In alternative embodiments, a power law flow distribution is assumed. A single calibration then allows the meter to be used on diverse conduits with different wall roughness or friction factor. Once the two paths have been selected to produce a measure free of dependence on friction, the flow may be accurately determined from these two paths, and a measurement may be taken along a single path to yield a measure of the friction factor for a given conduit, thus allowing the non-invasive measurement of this parameter. Preferably, this technique is then used to set up a conventional flow meter by solving for flow profile and analytically determining a meter factor or appropriate measurement path.

The measured transit times along the first and second paths may be combined in accordance with either a compiled, or a theoretical, model of the velocity distribution to determine a chord on which the measured velocity equals the mean flow velocity across the conduit cross-sectional area. Alternatively, the transit times may combined in accordance with the model of velocity profile to determine a meter factor, or the profile relation may be used to determine a single chord along which the measurements are independent of the second variable. Preferably the two paths used for eliminating the second variable differ substantially in their path average velocity.

In accordance with another aspect of the invention, the variables of the second type may be eliminated by taking a diametral transit time measurement, together with one or more point velocity measurements, or by taking a reflected path measurement together with one or more point measurements. Each point velocity measurement may be effected using a pitot tube situated at the point.

A detailed example follows for the analytic solution assuming the Pao relationship.

BRIEF DESCRIPTION OF THE DRAWINGS

These and other features of the invention will be understood from the description herein, taken together with the figures wherein.

DETAILED DESCRIPTION

Figure 1A:
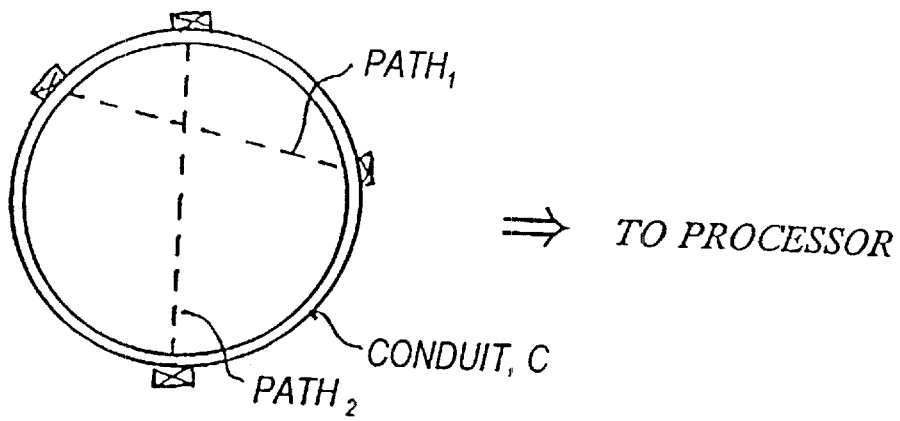
FIGS. 1A, 1B illustrates two representative ultrasonic path configurations for carrying out the method of the present invention.

In order to explain this invention, some technical subjects will first be briefly defined and discussed: these are the mean flow velocity, velocity profiles, and line integrals. For this purpose a coordinate system is defined.

The flow is measured in a pipe, and the Z-axis corresponds to the axis of the pipe. The X-axis and Y-axis are in the X-Y plane perpendicular to the pipe axis, with origins on the pipe axis. The cross-section of the pipe, also on this plane, is referred to as the pipe circle. In keeping with tradition, we define the coordinate, y to be the radial distance from the pipe wall to a point inside the pipe circle, and R to be the radius of the pipe.

The flow of fluid in a pipe is slower close to the walls and faster towards the middle of the pipe, so it has some velocity profile, which may be simple or complex, but is seldom of independent interest to the end user. The useful quantity, mean flow velocity, denoted $U_{mean}$, is equal to the total volume which flows through the pipe in a period of time divided by the time period and the cross-sectional area of the pipe.

Velocity Profile

For well-developed flow through long straight pipes, all the flow is parallel to the pipe axis. The flow velocity U, which is zero in the vicinity of the pipe wall, increases with y, the distance form the pipe wall, until it reaches a maximum at the center of the pipe, where y=R. The flow at each radial distance from the wall, U(y), is the actual measurable velocity profile.

Models of the velocity profile are given as equations of V(y), where V is the reduced flow velocity, i.e., the flow velocity divided by the mean flow velocity: $V=U/U_{mean}$. Rearranging this identity gives an equation which shows how to get $U_{mean}$ from the model and a measurement.

$$U_{mean} = \frac{U(y)}{V(y)} \tag{1}$$

One model of turbulent velocity profile is the Pao Equation:

$$V_{pao}(y)=1+2.15\cdot\sqrt{f}\cdot(0.665+\log(y/R)) \tag{2}$$

The Pao Equation (2) gives the reduced velocity V, as a function of three parameters: distance y from the wall, radius R, and friction factor f. The friction factor is in turn a function of Reynolds number and pipe wall roughness, neither of which is measured by the flow meter. As described in greater detail below, the present invention eliminates the need to know f.

For now, if we measure the flow U(y) at distance y from the wall, by using a pitot tube for example, then we can calculate $V_{pao}(y)$ from Equation (2), and then Equation (1) gives the mean flow velocity $U_{mean}$, assuming we have a value for the friction factor.

However, one does not, in general, rely on a series of pitot tubes, nor does one know the flow at particular points. Instead, a transit time ultrasonic flowmeter measures the velocity $U_{path}$ averaged over some path, rather than at a single point as in this example.

Beams and Paths

The apparatus of the present invention utilizes one or more ultrasonic transducers to pass a series of ultrasonic pulses along a path through the fluid, typically between transducer pairs, so that their transit through the fluid can be timed. We refer to the pulses passing between the transducers as a beam. The beam passes upstream and downstream in the flow, and the difference in upstream and downstream transit times gives the average velocity of that portion of the fluid which happens to intersect the beam.

To relate this measurement to the velocity profile, we observe that the velocity profile in a settled or well-developed flow is the same at any position one may choose along the pipe length; that is, it is independent of the Z-axis. So the Z-component of the beam may be ignored and only the X-Y components of the beam considered. This is the path. The actual physical region traversed by the beam may, and commonly does, extend along the conduit. However, the path is the projection of the beam onto the X-Y plane, and thus onto the pipe circle. (The Z-component of the beam remains important to the internal workings of the apparatus, as described further below.)

Thus the velocity measured by the transit time ultrasonic flow meter is the average velocity on the path, $U_{path}$, which is the projection of the measuring beam. The average reduced velocity on this path is $V_{path}$. We calculate $V_{path}$ with a line integral, and we measure $U_{path}$ with the flowmeter. Then $U_{mean}$ is obtained from Equation (3).

$$U_{mean} = \frac{U_{path}}{V_{path}} \tag{3}$$

Line Integrals

A line integral is the integration of a function along a curve. In the present case, the curve is the path, which is located on the pipe circle, and the function is the velocity profile, which is defined on the pipe circle. So the line integral of the velocity profile is the "total velocity" found along the path. This is not a sensible quantity. However, dividing this quantity by the path length gives the average velocity over the path. The path length is just the line integral of unity. The expression for $V_{path}$ in line integrals, is shown in Equation (4a), where C is the path curve.

$$V_{path} = \frac{\int_C V(y)\,ds}{\int_C \cdot ds} \tag{4a}$$

In case there is a need to actually evaluate a line integral, the procedure is outlined in Equation (4b), namely for a parametric equation of path X(t) Y(t)

$$\int_C V(y)\,ds = \int_{t_1}^{t_2} V(y(t))\cdot s'(t)\,dt \quad \text{where} \tag{4b}$$

$$y(t) = R - \sqrt{X(t)^2 + Y(t)^2} \quad s'(t) = \sqrt{X'(t)^2 + Y'(t)^2}$$

The Problem

As noted earlier, in connection with Equations (1) and (2), the friction factor f is not automatically known. That is, when f is needed, some value for f must be supplied externally, because the apparatus cannot measure it directly. Without a value for the friction factor, the model in Equation (2) cannot be used to determine the mean flow velocity.

Similarly, if the Power Law were used to model the velocity profile, values for the viscosity of the fluid and the pipe size would be required, and would have to be supplied externally, in order to determine the Reynolds number, which is the parameter that controls the shape of the Power Law model, just as the friction factor controls the shape of the Pao Equation model for velocity profile in a conduit.

With this invention, the apparatus determines the mean flow velocity directly from its own flow measurements, and it is not necessary to key in such external external information. Applicant achieves this in the following manner.

The Invention

While making computations with the Pao model, applicant observed that the velocity on a chord, divided by the average velocity on the diameter, correlated well with the meter factor. Based on these observations, applicant defined a new parameter Ω, which was found to depend only upon the geometry of the beam paths and to be independent of flow parameters like the friction factor. In terms of this parameter, the mean flow velocity, $U_{mean}$, is obtained from the measured flows $U_{path1}$ and $U_{path2}$ by using the equation $$U_{mean}=\Omega\cdot U_{path_2}-(\Omega-1)\cdot U_{path_1} \tag{5}$$

Applicant then checked this result by computing the value of Ω using other models of velocity profile, and also using the previously published profile measurements of Nikuradse, and confirming its predictive value. Since path-averaged measurements are readily provided by ultrasonic interrogation, the mean flow velocity can be obtained entirely from measurements made by the apparatus. No additional information about the various parameters or conditions giving rise to the velocity profile is required.

Substituting V for U, in equation (5), as suggested by Equation (3), and rearranging, gives the equation used to calculate $\Omega$.

$$\Omega = \frac{V_{path_1} - 1}{V_{path_1} - V_{path_2}} \tag{6}$$

In Equation (6), either numbers or expressions may be substituted for $V_{path1}$ and $V_{path2}$. Expressions may be obtained from symbolic integration of a velocity profile model, for example that of the Pao Equation. Numerical values may be obtained from numerical integration of a velocity profile model, or from experiments, intuition, guesswork, or CFD programs.

As a consequence, for developed straight flow, the difference between the mean flow velocity and the velocity measured on some path stands in substantially constant ratio to the difference between the velocity measured on that path and the velocity measured on a second path, regardless of changes in the shape of the velocity profile of the flow.

In other words, when the coefficient $\Omega$ is evaluated, as shown by Equation (6), or by another method, that value of $\Omega$ continues to give the correct value for the mean flow velocity when used in Equation (5), regardless of changes in the shape of the velocity profile of the flow, because $\Omega$, and any expression equal to $\Omega$, have little or no dependence on those variables which control the shape of the velocity profile.

For application of this invention, the preferred geometry is one that has a low value of $\Omega$. The statistical cost of using Equation (5) is an increase in random error or measurement by a factor roughly equal to $\Omega$, or 1, whichever is larger. However, because this effect involves random error, it can be compensated for by increasing the number of measurements.

Mathematical Demonstration

The theoretical independence of $\Omega$ from the friction factor f can be mathematically demonstrated for measurements made using any two paths. The explicit expression for $V_{path}$ obtained from the Pao Equation is shown as Equation (7).

$$V_{path_1} = \left[\frac{\int_{C_1} V_{pao}(y) ds}{\int_{C_1} \cdot ds}\right] \tag{7}$$

$$= 1 + 2.15 \cdot \sqrt{f} \cdot \left[\frac{\int_{C_1} \left(.665 + \log\left(\frac{y}{R}\right)\right) ds}{\int_{C_1} \cdot ds}\right]$$

The rules that a constant carries through an integral sign and that an integral sign carries through a sum have been applied. If Equation (7) for $V_{path1}$ and the analogous equation for $V_{path2}$ (formed by replacing $C_1$ by $C_2$) are combined to give $\Omega$, as shown by Equation (6), the friction factor cancels out to give Equation (8).

$$\Omega = \frac{\left[\frac{\int_{C_1}\left(.665 + \log\left(\frac{y}{R}\right)\right)ds}{\int_{C_1} \cdot ds}\right]}{\left[\frac{\int_{C_1}\left(.665 + \log\left(\frac{y}{R}\right)\right)ds}{\int_{C_1} \cdot ds}\right] - \left[\frac{\int_{C_2}\left(.665 + \log\left(\frac{y}{R}\right)\right)ds}{\int_{C_2} \cdot ds}\right]} \tag{8}$$

The cancellation of the friction factor from the expression for $\Omega$ is a consequence of the fact that the geometric variables (y,R) are separable from variables of flow (f). The concept of separation of variables leads to a more general statement of the invention, which encompasses many possible definitions or alternative formulations of the invariant $\Omega$.

Thus the invention applies to a transit time flow meter, or any similar apparatus which measures the flow rate averaged over a path. It determines the mean flow velocity by combining flow measurements made on two distinct paths within a developed flow.

The formula, or algorithm, for combining these measurements may be obtained from a model of the velocity profile, or from an approximation to such a model, in which variables related to a coordinate system are separable from variables which describe flow but are not related to a coordinate system. The formula may be any expression in $V_{path1}$ and $V_{path2}$, as defined by Equation (4a), from which the latter type of variable cancels or cancel approximately, and in which the former type of variable does not cancel. Equation (6) is an example of such a formula. Once such a formula is obtained it gives good results when used with any model of the velocity profile. Indeed, one may expect that no other formula will be found to be more accurate than Equation (6).

The measurement path values measured by the invention also return information about flow variables. The form this information takes depends upon which model is used for the velocity profile. If the model is the Pao Equation, then the flow measurements suffice to yield a value for the friction factor f.

For example a value for $V_{path1}$ may be obtained from $U_{path1}$, $U_{mean}$, and Equation (3). When this value is put into Equation (7), the equation then may be solved for f. Path 2 could be used instead.

Approximate Solutions

The Pao Equation gives an exact solution for $\Omega$, meaning the shape-controlling variable (the friction factor) cancels out of the expression for $\Omega$ formed from the Pao Equation. When using the Power Law model of velocity profile, however, the shape-controlling variable, the Reynolds number, does not cancel out of $\Omega$. However, since both equations model the same phenomenon, it can be expected that $\Omega$, when formed from the Power Law, will be only weakly dependent upon the Reynolds number.

There is no closed expression for $\Omega$ from the Power Law, so applicant uses a numerical test instead. This is done for path 1 being the diameter and path 2 being the 72° chord (as measured from an adjoining tangent). Table 1 lists the values of $\Omega$ generated by using different Reynolds numbers. By comparison the Pao Equation generates a single value: $\Omega=2.93$.

The systematic error in $U_{mean}$ due to varying Reynolds numbers is shown in Table I. Here the base condition is chosen to be a Reynolds number of 100,000, which gives $\Omega=2.703$. The error shown in $U_{mean}$ is the error that would arise by fixing $\Omega$ at 2.703 for all Reynolds numbers. Table I also indicates the accuracy with which the Reynolds number may be determined from the measurement of $U_{dia}$, the flow velocity on the diameter path. An error of +0.25% in $U_{dia}$ gives the low Reynolds number in the range and an error of −0.25% in $U_{dia}$ gives the high Reynolds number. The actual Reynold number for each range is listed in the left column. As illustrated, the error in average velocity may vary by a small fractional percent over a large range of Reynolds number, but the Reynold's number itself is not precisely determined from the value of Ω.

TABLE 1

The Effect of Varying Reynolds number on the Accuracy of $U_{mean}$, and the Effect of the Error in $U_{dia}$ on the Estimated Reynolds number

| Actual Reynolds number | | Ω | Error in $U_{mean}$ (%) | Range of Estimated Reynolds No. Due to ±0.25% Error in $U_{dia}$ |
| --- | --- | --- | --- | --- |
| | 4,000 | 2.626 | −.24 | 2,400...4,000 |
| | 10,000 | 2.657 | −.13 | 6,200...11,800 |
| base | 100,000 | 2.703 | 0.00 | 62,000...170,000 |
| | 1,000,000 | 2.733 | +.05 | 580,000...2,540,000 |
| | 10,000,000 | 2.753 | +.08 | 5,300,000...40,000,000 |

Determining the Mean Flow Velocity from a single flow Measurement

If $V_{path}$ in Equation (4a) evaluates to 1 for a particular path and velocity profile model, then Equation (3), and Equations (5)–(6), reduce to $U_{mean}=U_{path}$: the velocity measured on this particular path is equal to the mean flow velocity, assuming the model is accurate. For example, Equation (7) evaluates to 1 for the 56° chord (in Equation (4b): X(t)=R*t*sin(56°), Y(t)=R*cos(56°), −1<t<1). So a measurement on this chord will give $U_{mean}$ directly, assuming the Pao model applies. Thus, the method of the invention serves to identify a specific chord along which the ultrasonic flow measurement directly yields the mean flow velocity in the conduit. In this case, by inspection, if Equation (7) equals 1, then the term which multiplies f equals zero, and Equation (7) cannot be solved to obtain a value for f. This may be generalized to state that the single measurement method does not return any information about the flow.

In contrast to this method, the Ω method requires measurements on two paths, which may be chosen freely to obtain both convenience and reasonable accuracy. In addition, as noted above, the Ω method returns some information about the flow.

Figure 1B:
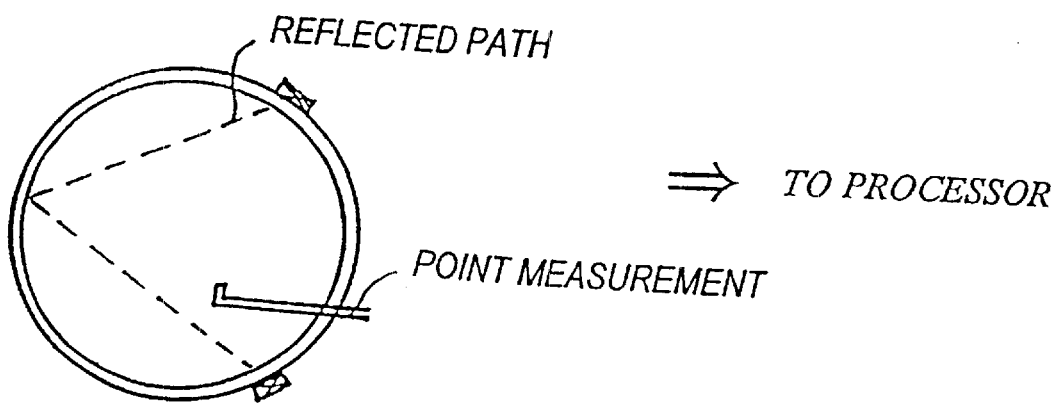
Figure 2:
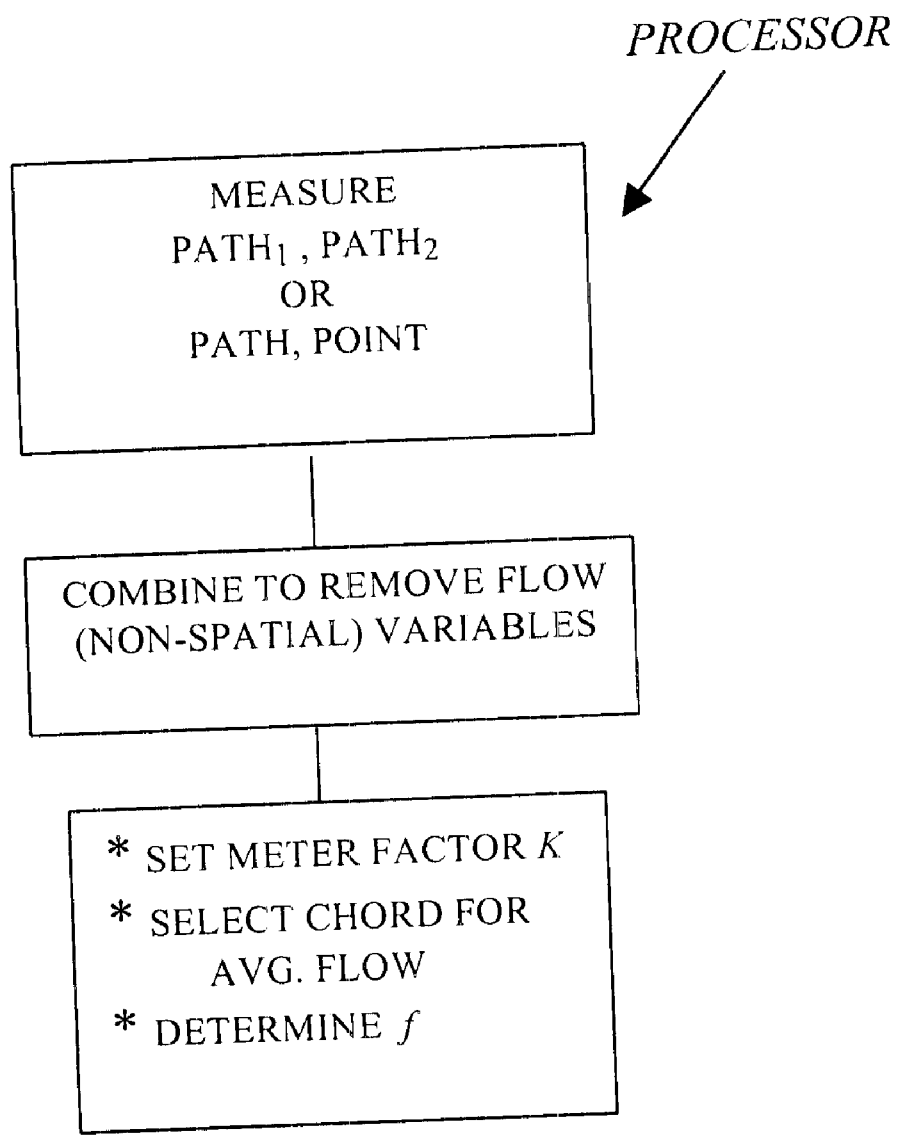
FIG. 2 illustrates the system of the present invention

In addition to utilizing the average velocity along two paths to derive an invariant Ω, correspondingly, the provision of a diametral path measurement and a point measurement may suffice to eliminate or substantially remove the dependence on non-coordinate information and effectively provide a flow measurement independent of the individual conduit characteristics. FIG. 1 illustrates several basic interrogation options of the present invention for taking path measurements $P_i$, reflected path measurements, and/or one or more point measurements in a conduit C for effecting an average flow calculation with incomplete information. In this case, the additional point measurement, which may for example be provided by sampling at the point with a pitot tube, or by any suitable point velocity sensing or interrogation technique, is selected base on a model or tabulation to yield the equivalent of a path-averaged value.

The invention being thus disclosed and described, further variations and modifications will occur to those skilled in the art, and all such variations and modifications are considered to be within the spirit and scope of the invention as set forth herein and defined in the claims appended hereto, together with equivalents thereof.

What is claimed is:

1. A method of performing an ultrasonic measurement of flow in a conduit, such method including the steps of
modeling said flow as a function of first variables related to a coordinate system and a second variable not related to the coordinate system, wherein the first variables are separable or substantially separable from the second variable,
identifying a path across the conduit and at least one place not on said path such that an integrated measurement of a signal along said path is analytically combinable with a measurement at the place not on said path to eliminate dependence of said function on the second variable
setting up an ultrasonic system for transmitting ultrasonic signals along the path to determine a first measurement representative of average fluid velocity on said path,
taking at least one second measurement of flow at the place not on said path,
analytically combining said first measurement and said second measurement to form an expression independent of the second variable, and
applying said expression to a measurement path to form an ultrasonic flow measurement independent of said variable.

2. The method of claim 1, wherein the place not on said path includes a second path, and the second measurement is a path measurement taken along the second path, and wherein the step of analytically combining includes combining the first measurement and the second measurement in accordance with Pao equation velocity relationships relating velocity profile to friction, so as to produce a measure of flow independent of friction factor.

3. The method of claim 2, wherein the step of analytically combining includes applying a flow measurement in a conduit performed along a single path to yield a measure of the friction factor.

4. The method of claim 1, including the step of combining the first measurement and the second measurement in accordance with a closed form model of velocity to determine a chord on which velocity as determined by ultrasonic transit time measurement equals mean flow velocity across cross-sectional area of the conduit.

5. The method of claim 1, wherein the step of analytically combining includes combining the first measurement and said second measurement in accordance with a tabulated model of velocity profile to determine a meter factor for single chord measurements that is independent of the second variable.

6. The method of claim 1, wherein the path is a diametral path, and wherein the step taking at least one second measurement includes taking at least one point flow measurement.

7. The method of claim 6, wherein the step of taking at least one point flow measurement includes taking a pitot tube measurement.

8. The method of claim 1, wherein the step of taking at least one second measurement includes taking an ultrasonic transit time measurement.

9. The method of claim 1, wherein the step of determining a first measurement and the step of taking at least one second measurement include taking measurements along first and second chordal paths, respectively.

10. The method of claim 1, wherein the step of setting up an ultrasonic system includes defining the path as a reflection path.

11. The method of claim 1, wherein said path is a first path, and the step of taking a second measurement includes taking said second measurement along a second path selected such that path average velocity of the second path differs substantially from path average velocity of the first path.

* * * * *